United States Patent Office 3,740,362
Patented June 19, 1973

3,740,362
NOVEL GRAFT COPOLYMERS HAVING BRANCHES OF ALTERNATING CO-MONOMER UNITS
Norman G. Gaylord, New Providence, N.J., assignor to Gaylord Research Institute, Inc., Newark, N.J.
No Drawing. Filed Aug. 25, 1970, Ser. No. 66,886
Int. Cl. C08b 23/00; C08f 15/40, 19/18
U.S. Cl. 260—17.4 GC    21 Claims

ABSTRACT OF THE DISCLOSURE

A method for preparing novel graft copolymers in which the branches are alternating copolymers, by reacting two comonomers in the presence of a preformed polymer which has been reacted with a complexing agent selected from the group consisting of Friedel-Crafts catalysts, Lewis acids, and organoaluminum halides.

---

This invention relates generally to novel graft copolymers and more particularly, it relates to graft copolymers in which the branches thereof are copolymers containing comonomeric units in regular alternating sequence, that is, graft copolymers in which the branches are alternating copolymers, and to novel processes for the preparation of such graft copolymers, more particularly defined as alternating copolymer graft copolymers.

It is an object of the present invention to provide new and novel graft copolymers.

Another object of the present invention is to provide new and improved processes for the preparation of graft copolymers.

A further object of the invention is preparation of graft copolymers containing alternating copolymer branches.

A further object is preparation of alternating copolymer graft copolymers by adding a polymer containing labile or active hydrogen atoms to a polymerizing reaction system.

A further object of the invention is to provide new and improved processes for the preparation of alternating copolymers.

Other and further objects will become obvious from the detailed description given hereinbelow.

It is known to prepare graft copolymers from vinyl monomers by polymerizing the monomer in the presence of a polymer containing free radical sites. The latter may result, for instance, from the attack of free radicals generated from a free radical precursor. However, in order to function, these free radicals must be capable of abstracting hydrogen atoms from the polymer skeleton. Thus, in grafting reactions benzoyl peroxide is an effective graft initiator while azobisisobutyronitrile yields little or no graft copolymer (Allen and Merrett, Journal of Polymer Science, 22, 193 (1956); Allen, Ayrey, Moore, and Scanlan, Journal of Polymer Science, 36, 55 (1959). The reason for this effect is that carbon radicals are usually inefficient hydrogen abstractors whereas acyloxy radicals are quite efficient for that purpose.

Radical sites may also be generated on the polymer skeleton as a result of chain transfer; that is, a growing polymer chain, whose growth has been initiated by a free radical derived from a catalyst or free radical precursor, may abstract a hydrogen or other abstractable atom from the backbone polymer. However, since the growing polymer chain contains a carbon radical which is an inefficient hydrogen abstractor, this is a less effective method for generating radical sites on a polymer skeleton than is the use of a suitable free radical precursor.

Under the influence of applied shear polymer chains can be ruptured to generate free radical sites at the ruptured ends of the chains. Radical sites can also be generated on a polymer chain under the influence of ultra violet or high energy radiation.

Regardless of the method used for generating radical sites on the polymer skeleton, the generation of such sites in the presence of a monomer results in the initiation of the polymerization of the monomer and the consequent formation of a graft copolymer.

The free radical initiated copolymerization of two monomers yields a copolymer whose composition is dependent upon the relative monomer reactivities and independent of the nature of the free radical precursor or the radical site. The composition of the copolymer chains present in a graft copolymer prepared by initiating the copolymerization of two monomers in the presence of a polymer containing free radical sites is identical with the composition of the copolymer prepared with a free radical catalyst in the absence of the polymer.

The copolymerization of a monomer containing strongly electron donating substituents with a monomer containing strongly electron withdrawing substituents yields an essentially alternating copolymer, that is, a copolymer in which the comonomer units are present in essentially equimolar quantities and are situated alternately along the copolymer chain. Alternating copolymers are also produced by the copolymerization of an electron donating monomer with an electron acceptor which does not readily undergo homopolymerization. For example, alternating copolymers are produced from the copolymerization of the electron donor monomers, styrene and butadiene, with the electron acceptor monomers vinylidene cyanide, maleic anhydride and sulfur dioxide.

The complexing of a moderately or weakly electron accepting monomer containing pendant carbonyl, carboxylate, carboxamide or nitrile groups with a Friedel-Crafts catalyst, Lewis acid or organoaluminum, halide transforms the monomer into a strongly electron accepting monomer.

The resultant complexed monomer undergoes copolymerization with electron donating monomers to produce alternating copolymers in the presence or absence of a free radical initiator (Gaylord and Takahashi, Journal of Polymer Science, Part B, 6, 743 (1968); ibid., 6, 749 (1968)).

Free radical polymerization is characterized by an initiation step in which a free radical species generated from the free radical catalyst or precursor adds a monomer molecule and the radical site is transferred to the monomer molecule. The propagation step involves the addition of further monomer molecules with the successive transfer of the radical site to each newly added monomer unit in turn. The resultant polymer chain consequently has a terminal unit derived from the free radical catalyst. Similarly, the initiation of graft copolymerization from a radical site generated on a polymer skeleton or backbone involves the successive transfer of the radical site to the comonomer units and the establishment of the original polymer as a terminal unit or trunk of the graft copolymer.

The preparation of alternating copolymers by the free radical initiated copolymerization of comonomers, one of which is a strong electron donor and the other an electron acceptor, per se or as a result of suitable complexing, yields copolymers which contain no residues derived from the free radical initiator. As an example, the alternating copolymer prepared by the copolymerization of styrene and maleic anhydride in the presence of azobisisobutyronitrile does not contain a terminal group arising from the azo catalyst (Tsuchida, Ohtami, Nakedai, and Shinohara, Kogyo Kagaku Zasshi, 70, 573 (1967)).

Alternating copolymers can also be formed from appropriate comonomers at low temperatures or as a result of thermal activation in the absence of a free radical precursor or in the presence of a free radical precursor at a temperature at which it is normally ineffective for the initiation of free radical polymerization.

It therefore becomes apparent from these prior art studies that the preparation of alternating copolymers does not proceed in the same manner as the preparation of random copolymers or homopolymers. Furthermore, it would appear from the evidence available that graft copolymers containing alternating copolymer branches could not be successfully prepared by initiation of the copolymerization by the radical sites generated on a polymer skeleton or backbone by attack of a free radical generated from a free radical precursor, as a result of chain transfer from a growing polymer chain, or as a result of applied shear or exposure to low or high energy radiation.

The ability to undergo a chain transfer reaction is a fundamental characteristic of free radical polymerization. The free radical initiated polymerization of a monomer or a mixture of comonomers in the presence of a chain transfer agent such as chloroform or carbon tetrachloride results in the abstraction of a hydrogen or a chlorine atom, respectively, thereby effecting chain termination and lowering of polymer molecular weight. The trichloromethyl radical resulting from the chain transfer reaction reinitiates polymerization and becomes incorporated into the new polymer chain.

Polymer radicals, that is, growing polymer chains, may transfer either intermolecularly or intramolecularly at any available active site on a polymer which is present during the polymerization reaction. The intermolecular chain transfer reaction is responsible for branching and for the initiation of graft copolymerization which occurs as a result of the attack of a growing polymer chain on an existing polymer.

Although chain transfer is a characteristic of free radical polymerization, it appears not to occur in the various methods for preparation of alternating copolymers. Thus, the azobisisobutyronitrile initiated copolymerization of styrene and maleic anhydride in the presence of chloroform or carbon tetrachloride yields an alternating copolymer which does not contain chlorine atoms, their absence being indicative of the absence of hydrogen or chlorine abstraction (Tsuchida, Ohtami, Nakedai, and Shinohara, Kogyo Kagaku Zasshi, 70, 573 (1967)). Similarly, there is no chlorine in the products produced in the polymerization of p-dioxene and maleic anhydride in the presence of acrylonitrile in chloroform solution using azobisisobutyronitrile as polymerization initiator (Iwatsuki and Yamashita, Journal of Polymer Science, Part A–1, 5, 1753 (1967)).

The copolymerization of styrene and methyl methacrylate in the presence of an organoaluminum halide which forms a complex with the methyl methacrylate, either in the absence or the presence of a free radical initiator, yields high molecular weight alternating copolymers irrespective of the ratio of comonomers in the initial monomer charge, the same results being obtained whether the reaction is carried out with toluene, chloroform or carbon tetrachloride as reaction medium, indicating that the growing copolymer chains do not participate in chain transfer reactions which result in abstraction of a hydrogen or chlorine atom (Gaylord and Antropiusova, Journal of Polymer Science, Part B, 7, 145 (1969)).

It is therefore again apparent from prior studies that the mechanism of alternating copolymerization is distinctly different from that of random copolymerization or homopolymerization and the generation of radical sites on a polymer as a result of chain transfer could not be expected to occur during the preparation of alternating copolymers. Consequently, graft copolymers containing alternating copolymer branches should not be formed as a result of intermolecular chain transfer.

It was disclosed in a co-pending application Ser. No. 66,885, filed Aug. 25, 1970 that graft copolymers containing alternating copolymer branches can be prepared by carrying out the copolymerization of comonomers which form alternating copolymers as a result of activation through complexing thereof, in the presence of homopolymers or copolymers containing labile or active hydrogen atoms.

It was further disclosed that the preparation of the alternating copolymer graft copolymers by the processes described therein can be successfully carried out both in the presence of a free radical catalyst or in the absence thereof.

The novel graft copolymers of the co-pending application are prepared under appropriate selective conditions utilizing a polymer or copolymer which contains labile or active hydrogen atoms located on the trunk, skeleton, or backbone polymer.

The polymers which are effective as trunk or substrate polymers may be homopolymers or copolymers containing at least 10% of one of the following types of active hydrogen atoms:

(1) Hydrogen atoms attached to tertiary or trisubstituted carbon atoms

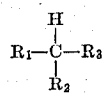

(2) Hydrogen atoms attached to (a) benzylic or (b) allylic carbon atoms

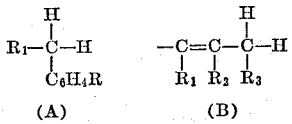

(3) Hydrogen atoms attached to carbon atoms adjacent to an electron donor atom

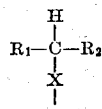

wherein X is selected from a nitrogen, sulfur or oxygen atom;

(4) Hydrogen atoms attached to carbon atoms adjacent to an electron acceptor group

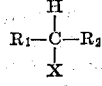

wherein X is a carbonyl, carboxyl, carboxamide, carboxylate, thiocarbonyl, thiocarboxyl, thiocarboxamide, thiocarboxylate, nitrile, nitro, or sulfonyl group;

(5) Hydrogen atoms positioned adjacent to a carbonyl group

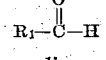

(6) Hydrogen atoms adjacent to an electron donor atom

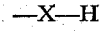

where X is a nitrogen, sulfur or oxygen atom.

The active hydrogen atoms required may be present on the backbone or skeleton of the trunk polymer or themselves on pendant groups.

Effective trunk polymers include but are not specifically limited to polymers derived from one or more of the following monomers: ethylene, propylene, butene, higher α-olefins, styrene, vinyltoluene, butadiene, isoprene, chloroprene, allyl acetate, allyl chloride, vinyl chloride, alkyl vinyl ether, vinyl acetate, acrolein, alkyl acrylate, alkyl methacrylate, acrylonitrile, α-methacrylonitrile, acrylamide, methacrylamide, acrylic acid, methacrylic acid, itaconic acid, alkyl vinyl sulfide, and the like. The trunk polymer itself may be linear or branched. Thus, polypropylene, high and low density polyethylene and ethylenepropylene copolymers all contain tertiary carbon atoms and can be employed as effective trunk polymers.

Modified polymers obtained by chemical modification are also effective substrate polymers. Thus, chlorosulfonated polyethylene and chlorinated polyethylene are also useful as substrates.

Ring opening, polyaddition and condensation polymers and copolymers are also effective as trunk polymers. Thus poly(ethylene oxide), poly(propylene oxide), poly(ethylenimine), poly(ethylene sulfide), polyurethanes, polyesters, polyamides, urea-formaldehyde resins, melamine-formaldehyde resins, phenol-formaldehyde resins, silicones and poly[bis(chloromethyl)oxetane] are further typical substrate polymers.

Block and graft copolymers as well as alternating copolymers are as effective as homopolymers and random copolymers provided they contain the labile or active hydrogen atoms required as set forth above.

Natural polymers such as cellulose, starch, gelatin, silk, casein, gum arabic and leather as well as derivatives of natural polymers including cellulose esters, carboxymethyl cellulose, hydroxyethyl cellulose, oxidized cellulose, oxidized starch and cellulose nitrate are also used as trunk polymers for the invention.

The copolymerization of an electron donor monomer and a strong electron acceptor monomer results in the formation of a substantially equimolar alternating copolymer.

The complexing of a moderately or weakly electron accepting monomer containing pendant carbonyl, carboxylate, carboxamide, thiocarbonyl, thiocarboxylate, thiolcarboxylate, thiocarboxamide or nitrile groups with a Friedel-Crafts catalyst, Lewis acid or organoaluminum halide increases the electron accepting characteristics of the monomer and, on copolymerization with an electron donor monomer, yields alternating copolymers. Thus, complexing of methyl acrylate, methyl methacrylate, acrylamide or acrylonitrile with zinc chloride, aluminum chloride, boron trifluoride, ethyl aluminum dichloride or ethyl aluminum sesquichloride permits the formation of alternating copolymers with butadiene, isoprene, styrene, propylene, ethylene and higher α-olefines.

The preparation of alternating copolymers in accord with the process disclosed in the co-pending application from electron donor monomers and electron acceptor monomers as a result of complexing of the electron acceptor monomer can be carried out in bulk, or in an inert solvent such as dioxane, toluene, chloroform or carbon tetrachloride, or in an aqueous medium provided neither the monomers nor complexing agent react readily with water. The reaction proceeds equally well in homogeneous or heterogeneous media.

The copolymerization of various comonomers in the presence of a complexing agent to form alternating copolymers occurs spontaneously in the absence of a catalyst at temperatures as low as −100° C. or at elevated temperatures as high as 150° C. However, the addition of a free radical precursor often permits reduction in the polymerization temperature, even to temperatures as low as those at which the free radical precursor is ineffective in initiating conventional free radical polymerization or copolymerization.

Th addition of a free radical precursor is necessary to catalyze the preparation of alternating copolymers from the copolymerization of those specific comonomers which do not form alternating copolymers spontaneously in the presence of certain complexing agents under certain reaction conditions in the absence of a catalyst. Suitable free radical precursors include conventional free radical polymerization catalysts such as lauroyl peroxide, benzoyl peroxide, tert-butyl peroxypivalate, di-tert-butyl peroxide, dicumyl peroxide, tert-butyl hydroperoxide, hydrogen peroxide, ascaridole, peracetic acid, ammonium persulfate, azobisisobutyronitrile and azobis-(methyl isobutyrate). Ultraviolet or gamma radiation are also effective radical sources. Compounds susceptible to oxidation upon exposure to air or oxygen, such as dioxane, tetrahydrofuran and paraldehyde, also act as radical precursors after such exposure.

Various metal salts are now known to be free radical generators under suitable activation. These salts include the nitrate, nitrites, chlorates and perchlorates of silver, lithium, and magnesium as well as the ammonium salts.

Redox systems, i.e. combinations of oxidizing and reducing agents, are useful sources of free radicals, particularly where it is desired to carry out the polymerization reaction at low temperatures and/or in an aqueous medium. Typical examples of useful redox systems are potassium persulfate-sodium bisulfite, hydrogen peroxide-ferrous ammonium sulfate and ammonium persulfate-dodecyl mercaptan.

It was disclosed in the co-pending application that the grafting of the alternating copolymer on the substrate polymer which contains active hydrogen atoms is carried out by contacting the monomer mixture, the complexing agent and the free radical precursor where necessary and as desired, with the substrate polymer and carrying out the alternating copolymerization under substantially the same conditions as those used in the absence of polymer. Thus, the polymer can be dissolved in a solvent and the comonomers, complexing agent and radical source added. Alternately, the polymer and radical precursor may be dissolved in the monomer mixture to which the complexing agent has previously been added. An excess of one of the monomers can be used as solvent since the alternating copolymer is generally formed irrespective of the comonomer ratio. The comonomer mixture, complexing agent and radical catalyst can also be added to the dissolved polymer or to molten polymer in a suitable mixing device such as an extruder or the like.

It was further disclosed that the comonomer mixture, the complexing agent and the free radical precursor can be added to a dispersion of the polymer in water or to a polymer latex or emulsion. In these cases, a water soluble free radical precursor such as ammonium persulfate or hydrogen peroxide or a redox system such as ammonium persulfate-sodium bisulfite is particularly effective.

It has now been discovered that higher yields of alternating copolymers and/or higher levels of grafting on trunk or substrate polymers or copolymers containing hetero atoms are obtained when the latter are reacted or complexed with the complexing agent before the addition of the comonomers and the free radical precursor where necessary and as desired.

The polymers or copolymers which are effective substrates for complexation with a Friedel-Crafts catalyst, Lewis acid or organoaluminum halide contain hetero atoms such as oxygen, nitrogen, sulfur or phosphorous. The hetero atoms may be present on the backbone or skeleton of the substrate copolymer or in pendant groups.

The hetero atoms may be present either singly or together with other and either the same or different hetero atoms in the same functional group or in different functional groups. Thus, polymers or copolymers containing backbone or pendant functional groups of the following types are effective substrates for complexation: oxy-(ether), carbonyl, carboxyl, carboxylate, hydroxyl, carboxamido, carbamyl, oximido, hydroximino, amino, nitroso, cyano, nitro, imino, imido, isonitro, azoxy, azino, azido, amine oxide, diazo, guanyl, isocyano, hydrazo, thio, thiocarbonyl, thiocarbamyl, thiol, sulfinyl, sulfonyl, sulfonamido, sulfamino, perthio (polysulfide), thiocarboxylate, thiolcarboxylate, sulfone, sulfoxide, phosphoryl, phosphonyl, phosphoroso, phosphazo, phosphino and phosphonamido.

In carrying out the process of the present invention, the complexing agent is added to the polymer which is either dissolved in a solvent, dispersed or emulsified in a nonsolvent, in the molten state or undergoing deformation in a suitable mixing device. Alternately, the polymer may be dissolved or dispersed in part or all of the electron donor monomer before the addition of the complexing agent. After a suitable reaction time which may vary between 5 minutes and 48 hours depending upon the specific functional group, its accessibility and the reaction medium, the comonomers and the free radical precursor where necessary and as desired, are added.

The concentration of complexing agent is dependent upon the number of hetero atoms in the substrate polymer and may vary between 0.01 and 1 mole of complexing agent per hetero atom or functional group. The preferred amount of complexing agent is also dependent upon the amount of electron acceptor monomer to be used in the alternating copolymerization and may vary between 0.01 and 1 mole of complexing agent per mole of acceptor monomer. The preferred amount of complexing agent is between 0.05 and 1 mole per mole of acceptor monomer.

The temperature at which the complexation of the polymer with the complexing agent is carried out may be the same or different from that at which the copolymerization of the monomer mixture is carried out. Thus, the complexation may be carried out at temperatures as low as −100° C. or at elevated temperatures as high as 150° C. The copolymerization of the monomer mixture in the presence of the complexed polymer may be carried out at the same temperature or at some lower or higher temperature, in the absence or the presence of a free radical precursor where necessary and as desired.

Due to the rapid decomposition of the free radical precursor in the presence of the complexed polymer, it is preferred to add it after or together with the monomer mixture. In a heterogeneous system, such as in a polymer latex the free radical catalyst is generally added after the monomers have had an opportunity to diffuse into the complexed polymer.

In a particularly useful embodiment of the present invention, one or more polar monomers containing pendant carbonyl, carboxylate, carboxamide, nitrile or other groups containing electron donor atoms such as oxygen, nitrogen and sulfur, are complexed with a Friedel-Crafts catalyst, Lewis acid or organometal halide and homopolymerized in the presence of light, a small amount of oxygen or a free radical catalyst. The amount of complexing agent may be varied between 0.01 and 1 mole per mole of monomer. The homopolymer or copolymer which is formed as a result of this polymerization reaction contains complexed complexing agent. When a mixture of electron donor monomer and electron acceptor monomer are added to the complexed polymer, followed by a free radical precursor where necessary and as desired, alternating copolymer and/or alternating copolymer graft copolymer are formed.

Alternately a substrate polymer containing complexed complexing agent may be prepared by copolymerizing an electron donor monomer and an electron acceptor monomer in the presence of a complexing agent. The resultant complexed alternating copolymer may then be mixed with the same or different comonomers and converted to an alternating copolymer graft copolymer.

When the substrate copolymer containing hetero atoms is subjected to degradation such as under chemical or thermal treatment, the alternating copolymer may be obtained by subjecting the alternating copolymer graft copolymer to such treatment. Thus, an alternating copolymer graft copolymer of a polysaccharide such as cellulose or of a polyamide such as a polypeptide may be hydrolyzed in the presence of an acid or a base, permitting the essentially pure alternating copolymer to be recovered. This indirectly provides a means of obtaining the alternating copolymer in higher yield or molecular weight than when the alternating copolymer is prepared in the absence of a substrate polymer.

The following examples are representative of the methods which are useful in the practice of this invention and should not be considered in any matter as limiting the scope thereof.

EXAMPLE 1

Poly(styrene-acrylonitrile) alternating copolymer grafted onto poly(butadiene-acrylonitrile)

(A) A solution of 4.0 g. of a 70:30 (weight ratio) poly(butadiene-acrylonitrile) copolymer in 40 ml. of toluene was brought to 40° C. and 22 mmoles of ethyl aluminum sesquichloride was added. The mixture was stirred under nitrogen at 40° C. for 1 hour. The addition of 4.1 g. of acrylonitrile was followed by the addition of 8.0 g. of styrene and 0.36 g. of benzoyl peroxide. The reaction mixture was maintained at 40° C. for 5 hours and then poured into methanol. The precipitated product was washed exhaustively with methanol and dried. The weight of the product indicated a monomer conversion of 87%. The product was fractionated by successive extractions in a Soxhlet extractor with benzene, acetone and dimethylformamide. The benzene extract was 19% of the product and analyzed as a 27:64:9 acrylonitrile/butadiene/styrene molar composition, indicating the grafting of a small amount of styrene on the original substrate copolymer. The acetone extract was 12% of the product and analyzed as an equimolar poly(styrene-acrylonitrile) copolymer. Dimethylformamide at 60–65° C. extracted less than 1% of the product. The residue accounted for 68% of the product and analyzed as a 39:40:21 acrylonitrile/butadiene/styrene molar composition. When the analysis was corrected for the butadiene-acrylonitrile content of the substrate copolymer, the grafted copolymer was found to contain styrene and acrylonitrile in 49:51, essentially equimolar, ratio.

EXAMPLE 2

Poly(styrene-acrylonitrile) alternating copolymer grafted onto poly(butyl acrylate)

(A) An aqueous zinc chloride solution, 5 ml., containing 1.704 g. (12.5 mmoles) of zinc chloride was added to 18.8 g. of a 42.5% solids poly(butyl acrylate) latex. The polymer/$ZnCl_2$ mole ratio was 5. The reaction mixture was stirred at 30° C. for 24 hours. A mixture of 14.4 ml. (125 mmoles) of styrene and 8.4 ml. (125 mmoles) of acrylonitrile was added followed by the addition of 0.27 g. of potassium persulfate and 0.19 g. of sodium meta bisulfite. The reaction mixture was maintained at 30° C. for 3 hours and the product was isolated after precipitation and extraction with methanol. The yield of product was 21.6 g., representing a 69.5% conversion of monomer to copolymer. Extraction with hexane removed 7.1% of the total product and the extract analyzed as unchanged poly(butyl acrylate). The acetone extract represented 47.1% of the total product and analyzed as an equimolar poly(styrene-acrylonitrile) copolymer containing 1.4 mole-percent of poly(butyl acrylate). The residue represented 45.8% of the total product and analyzed as a graft copolymer having a 64.5/18.0/17.5 butyl acrylate/styrene/acrylonitrile molar composition in which the styrene and acrylonitrile units were present in 50.7/49.3 molar ratio.

(B) The procedure described in (A) was modified by complexing the poly(butyl acrylate) (18.8 g. of 42.5% solids latex containing 8.0 g. of polymer) with one-half of the zinc chloride (5 ml. of an aqueous solution containing 0.85 g. of zinc chloride) for 24 hours at 30° C. The remaining 0.85 g. of zinc chloride was mixed with 8.4 ml. of acrylonitrile and then added to the reaction mixture, followed by 14.4 ml. of styrene, 0.27 g. of potassium persulfate and 0.19 g. of sodium meta bisulfite. After 3 hours at 30° C. the reaction mixture was treated with methanol. The isolated reaction product weighed 20.1 g., representing a 61.8% monomer conversion. The hexane extract analyzed as poly(butyl acrylate) and represented 6.7% of the total product. The acetone extract was 50.6% of the total product and analyzed as essentially equimolar poly(styrene-acrylonitrile) copolymer containing 2.2 mole-percent of poly(butyl acrylate). The residue represented 42.7% of the total product and was a graft copolymer having a 60.0/21.2/18.8 butyl acrylate/styrene/acrylonitrile molar composition in which the styrene/acrylonitrile mole ratio was 53/47.

(C) The 18.8 g. of poly(butyl acrylate) latex was first mixed with 14.4 ml. of styrene for 24 hours at 30° C. and then 4.26 g. of solid zinc chloride was added. The mixture was maintained at 42–44° C. for 5 hours, after which 8.4 ml. of acrylonitrile and 0.4 g. of potassium persulfate were added. The mixture was stirred at 50° C. for 20 hours before coagulation with methanol. The reaction product weighed 25.3 g. representing an 88.4% monomer conversion. Extraction with hexane, acetone and ethyl acetate successively removed 8.7, 4.2 and 3.1% of the total product. The residue representing 84.0% of the total product was a graft copolymer having a 24.6/40.1/35.3 butyl acrylate/styrene/acrylonitrile molar composition with a styrene/acrylonitrile mole ratio of 53.3/46.7.

(D) When 3.4 g. (25 mmoles) of solid zinc chloride was mixed with 6.5 g. (50 mmoles) of solid poly(butyl acrylate) and the mixture was stirred or homogenized vigorously for 1 hour at 50° C., a transparent yellow-brown gel was obtained. The gel was dissolved in 50 ml. of toluene and the mixture was stirred at 50° C. for 6 hours. A mixture of 14.4 ml. of styrene and 8.4 ml. of acrylonitrile was added at 25° C., followed by 0.5 ml. of a 50% solution of 2-methylpentamoyl peroxide in hexane. The mixture was maintained at 25° C. for 3 hours before the product was precipitated with methanol. The product yield was 16.1 g. representing a 53% monomer conversion. The hexane-soluble fraction was 20% of the total product and analyzed as unchanged poly(butylacrylate). The ethyl acetate-soluble fraction was 7.5% of the total product and analyzed as a 32.1/35.6/32.3 butyl acrylate/styrene/acrylonitrile molar composition with a 52.3/47.7 styrene/acrylonitrile molar ratio. The residue comprised 72.5% of the total product and analyzed as a graft copolymer with a 11.2/44.4/44.4 butyl acrylate/styrene/acrylonitrile molar composition with a 50/50 styrene/acrylonitrile molar ratio.

(E) A solution of 8.0 g. of poly(butyl acrylate) in 50 ml. of toluene was stirred at 25° C. while 15.7 mmoles of ethyl aluminum sesquichloride was added. After 30 minutes at 25° C., a mixture of 14.4 ml. of styrene and 8.4 ml. of acrylonitrile was added followed by 0.5 ml. of a 50% solution of 2-methylpentanoyl peroxide in hexane. The mixture was maintained at 22° C. for 3 hours and then coagulated with methanol. The product yield was 18.9 g., representing a 55.6% monomer conversion. The hexane extract was 3.6% of the product and analyzed as poly(butyl acrylate). The acetone and ethyl acetate extracts were 64.3% and 0.6% of the total product while the residue was 31.5% of the product. All three fractions contained poly(butyl acrylate) and styrene/acrylonitrile in approximately equimolar ratio. Thus, the acetone-soluble fraction, ethyl acetate-soluble fraction and the residue analyzed, respectively, as 2.2/52.5/45.3, 18.9/44.2/36.9 and 67.5/17.6/14.9 butyl acrylate/styrene/acrylonitrile molar compositions with styrene/acrylonitrile molar ratios of 53.7/46.3, 54.5/45.5 and 54.2/45.8, respectively.

EXAMPLE 3

Poly(styrene-acrylonitrile) alternating copolymer grafted onto cellulose

A 10 g. portion of wood pulp was soaked in a 50% aqueous zinc chloride solution containing 5% potassium persulfate at room temperature for one hour. The wet cellulose was removed from the solution and permitted to drain. A portion was dried and pyrolyzed at 600° C. to determine the ash content. The calculated zinc chloride content was 1.5 g. per 10 g. cellulose. The wet, drained cellulose was stirred in an equimolar mixture of styrene and acrylonitrile at 40° C. for one hour and then centrifuged to remove unreacted monomers and water. When the filtrate was mixed with methanol only traces of ungrafted copolymer were recovered. The recovered monomers indicated 55% monomer conversion. The centrifuged solid was mixed with methanol and the insoluble solid was filtered, washed with aqueous ammonia and methanol and dried. The product weight was 60 g. The product was stirred in acetone at room temperature for 3 hours and filtered to yield an acetone-soluble fraction containing ungrafted copolymer and an acetone-insoluble fraction containing copolymer grafted cellulose. The acetone solution was concentrated in vacuo, precipitated in methanol and dried. The acetone-insoluble fraction was washed with methanol and dried. The ungrafted copolymer weighed 15 g. (25% of the total product) and had a nitrogen content of 9.42% indicating an essentially equimolar 48/52 styrene-acrylonitrile content. The grafted cellulose which weighed 45 g. (75% of the total product) indicating a 350% add-on, was hydrolyzed by refluxing with 0.5 N HCl for 6 hours and filtered. The residual solid was extracted with acetone and the acetone-soluble fraction was recovered as grafted copolymer. The grafted copolymer had a 8.72% nitrogen content indicating a 51/49 essentially equimolar poly(styrene-acrylonitrile) composition. The intrinsic viscosities of the ungrafted and grafted alternating copolymers in dimethylformamide at 30° C. were 2.6 and 2.9, respectively.

EXAMPLE 4

Poly(isoprene-acrylonitrile) alternating copolymer grafted onto poly(styrene-butyl acrylate) alternating copolymer An equimolar mixture of 40 mmoles of styrene and 40 mmoles of butyl acrylate in 60 ml. of toluene was polymerized at 20° C. in the presence of 4.5 ml. of ethyl aluminum sesquichloride. The butyl acrylate/organoaluminum halide mole ratio was 2. After 48 hours the polymerization was complete and the product was identified as the equimolar alternating copolymer. A mixture of 8 ml. (80 mmoles) of isoprene and 5.3 ml. (80 mmoles) of acrylonitrile was added to 9.3 g. of the copolymer and the temperature was maintained at 20° C. for 8 hours. The product yield was 13.2 g. representing a 40.2% monomer conversion. Extraction with chloroform removed 24% of the total product. The chloroform-insoluble residue represented 76% of the total product.

When the same reaction was carried out with 0.2 g. of benzoyl peroxide in the mixture of isoprene and acrylonitrile, the monomer conversion after 3 hours at 20° C. was 55.2%. The acetone-soluble fraction was 11% of the product, the chloroform-soluble fraction was 1.4% of the product while the residue was 87.6% of the product.

The residues in the reactions carried out in the absence as well as in the presence of benzoyl peroxide were analyzed and also subjected to NMR analysis. In both cases the product was identified as a graft copolymer containing alternating styrene and butyl acrylate units as well as alternating isoprene and acrylonitrile units.

The alternating copolymer graft copolymers prepared by the process of the present invention have properties which depend upon the nature of the backbone polymer and the specific alternating copolymer grafted thereon.

Thus, grafting of an alternating copolymer containing carboxyl groups onto a hydrocarbon backbone increases the flexural modulus and tensile strength and enhances the adhesion to various substrates, printability, dyeability, compatibility with inorganic or organic fillers and pigments, adhesion to glass and other reinforcing fibers, dispersibility in aqueous solutions of inorganic or organic bases and crosslinkability, e.g. with polyvalent metal compounds such as zinc acetate, basic aluminum acetate or zirconyl acetylacetonate as well as metal oxides.

The grafting of an alternating copolymer which is rigid on an elastomeric backbone increases the modulus of the elastomer. Since the alternating copolymer is generally insoluble in hydrocarbon solvents it increases the oil resistance of a hydrocarbon elastomer.

The grafting of an alternating copolymer containing acrylonitrile on a substrate gives increased resistance to discoloration on heating or exposure to acids in contrast to the grafting of a non-alternating copolymer which contains sequences of acrylonitrile units, as occurs with conventional free radical grafting techniques.

The alternating copolymer graft copolymers prepared by the process of the present invention may be fabricated into shaped objects by conventional fabrication methods. They may be extruded into films, sheets, tubes, fibers, profiles and other shapes. They may also be converted into films or sheets by calendering and flat-bed pressing. The fibers produced by wet or dry spinning or film splitting may be converted into woven and non-woven structures which may be used per se or after coating or printing with conventional paper or textile coating or printing compositions. The films or fiber mats may be laminated to substrates such as metals, wood, natural or synthetic fiber or film structures, etc. and may also be metallized or metal plated.

The grafted copolymers prepared by the process of the present invention may be converted into fine powders and used in the fluid bed coating of heated substrates. They may also be cold-formed or compression or injection molded into shaped objects which may be printed, coated, metallized, metal plated, etc. The blending of a blowing agent with the graft copolymer prior to fabrication or the injection of a suitable gaseous material into the molten mass permits the production of foamed objects of decreased density.

What is claimed is:

1. A process for production of alternating copolymers and alternating copolymer graft copolymers having copolymer branches in which the comonomer units are in alternating sequence, which comprises
   (a) reacting a polymer containing active hydrogen atoms and one or more hetero atoms selected from the group consisting of oxygen, sulfur and nitrogen, with a complexing agent selected from the group consisting of Friedel-Crafts catalysts, Lewis acids and organoaluminum halides, in the absence of a grafting electron acceptor monomer, and
   (b) reacting the resulting complexed polymer with a monomer mixture containing (1) an electron donor monomer selected from the group consisting of alpha-olefins, styrene and conjugated dienes, and (2) an electron acceptor monomer selected from the group consisting of monomers containing pendant carbonyl, carboxylate, carboxamide, thiocarbonyl, thiocarboxylate, thiocarboxamide and nitrile groups.

2. The process of claim 1 in which the comonomers reacted are styrene and acrylonitrile.

3. The process of claim 1 in which the comonomers reacted are a conjugated diene and acrylonitrile.

4. The process of claim 1 in which the polymer undergoing complexation is a copolymer of butadiene and acrylonitrile.

5. The process of claim 1 in which the polymer undergoing complexation is a copolymer of styrene and an acrylic ester.

6. The process of claim 1 in which the polymer undergoing complexation is poly(butyl acrylate).

7. The process of claim 1 in which the polymer undergoing complexation is an alternating copolymer.

8. The process of claim 1 in which the polymer undergoing complexation is cellulose.

9. The process of claim 1 in which the complexing agent is an organoaluminum halide.

10. The process of claim 1 in which the complexing agent is a metal halide.

11. The process of claim 1 in which the process is carried out in the presence of a free radical precursor.

12. The process of claim 10 in which the process is carried out in an aqueous medium.

13. A process for production of alternating copolymer graft copolymers having copolymer branches in which the comonomer units are in alternating sequence which comprises
   (a) reacting an electron donor monomer selected from the group consisting of alpha-olefins, styrene and conjugated dienes with an electron acceptor monomer selected from the group consisting of monomers containing pendant carbonyl, carboxylate, carboxamide, thiocarbonyl, thiocarboxylate, thiocarboxamide and nitrile groups in the presence of a complexing agent selected from the group consisting of Friedel-Crafts catalysts, Lewis acids and organoaluminum halides in the absence of a grafting electron acceptor monomer, and
   (b) reacting the resulting complexed polymer with a monomer mixture containing an electron donor monomer selected from the group consisting of alpha-olefins, styrene and conjugated dienes and an electron acceptor monomer selected from the group consisting of monomers containing pendant carbonyl, carboxylate, carboxamide, thiocarbonyl, thiocarboxylate, thiocarboxamide and nitrile groups in which the donor monomer and/or the acceptor monomers are the same or different from the monomers in (a).

14. The process of claim 13 in which the comonomers reacted in the production of the complexed polymer are styrene and an acrylic ester.

15. The process of claim 13 in which the comonomers reacted with the complexed polymer are a conjugated diene and acrylonitrile.

16. The process of claim 13 in which the complexing agent is an organometallic compound.

17. The process of claim 13 in which the complexing agent is a metal halide.

18. The process of claim 13 in which the process is carried out in the presence of a free radical precursor.

19. A process for production of alternating copolymer graft copolymers having copolymer branches in which the comonomer units are in alternating sequence, which comprises
   (a) polymerizing one or more polar monomers in the presence of a complexing agent selected from the group consisting of Friedel-Crafts catalysts, Lewis acids and organoaluminum halides, in the absence of a grafting electron acceptor monomer, and
   (b) reacting the resulting complexed polymer with a monomer mixture containing an electron donor monomer selected from the group consisting of alpha-olefins, styrene and conjugated dienes and an electron acceptor monomer selected from the group consisting of monomers containing pendant carbonyl, carboxylate, carboxamide, thiocarbonyl, thiocarboxylate, thiocarboxamide and nitrile groups.

20. The product produced by the process of claim 1.

21. A process for production of alternating copolymers and alternating copolymer graft copolymers having copolymer branches in which the comonomer units are in alternating sequence, which comprises
   (a) reacting a polymer containing active hydrogen atoms and one or more hetero atoms selected from the group consisting of oxygen, sulfur and nitrogen, with a complexing agent selected from the group consisting of Friedel-Crafts catalysts, Lewis acids and organoaluminum halides, in the absence of a grafting electron acceptor monomer, and (b) reacting the resulting complexed polymer with a monomer mixture containing (1) an electron donor monomer selected from the group consisting of alpha-olefins, styrene and conjugated dienes, and (2) an electron acceptor monomer selected from the group consisting of acrylonitrile, acrylamide and acrylic esters.

References Cited

UNITED STATES PATENTS

| | | | |
|---|---|---|---|
| 3,326,870 | 6/1967 | Nakaguchi et al. | 260—85.5 |
| 3,432,577 | 3/1969 | Sernivk | 260—879 |
| 3,448,173 | 6/1969 | Ryan et al. | 260—876 |
| 3,502,604 | 3/1970 | Nakatsuka et al. | 260—29.6 |
| 3,573,235 | 3/1971 | Yamamoto et al. | 260—8 |

FOREIGN PATENTS

| | | | |
|---|---|---|---|
| 1,921,112 | 11/1970 | Germany | 260—876 |
| 1,123,723 | 8/1968 | Great Britain. | |
| 1,123,724 | 8/1968 | Great Britain. | |

OTHER REFERENCES

Yabumoto et al.: Alternating Copolymerization, Jour. of Polym. Sci., vol. 7, part A-1, pp. 1577–1588 (1969).

JOHN C. BLEUTGE, Primary Examiner

J. SEIBERT, Assistant Examiner

U.S. Cl. X.R.

204—159.12, 159.13, 159.15, 159.16, 159.17; 260—8; 17 A, 29.6 RB, 827, 840, 845, 847, 848, 851, 852, 856, 857 G, 859 R, 859 PV, 861, 869, 872, 876 R, 878 R, 879, 880 R; 881, 883, 884, 885, 886, 887, 897 B, 897 C, 898, 899, 901